United States Patent
John

(10) Patent No.: US 10,771,789 B2
(45) Date of Patent: Sep. 8, 2020

(54) COMPLEXITY ADAPTIVE RATE CONTROL

(71) Applicant: Google Inc., Mountain View, CA (US)

(72) Inventor: Sam John, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/600,272

(22) Filed: May 19, 2017

(65) Prior Publication Data
US 2018/0338146 A1   Nov. 22, 2018

(51) Int. Cl.
*H03M 1/78* (2006.01)
*H04N 19/14* (2014.01)
(Continued)

(52) U.S. Cl.
CPC ......... *H04N 19/14* (2014.11); *H04L 41/0816* (2013.01); *H04L 65/601* (2013.01);
(Continued)

(58) Field of Classification Search
CPC ......... H03M 13/2924; H03M 13/1515; H03M 13/13; H03M 13/2921; H03M 13/616; H03M 13/09; H03M 13/116; H03M 13/154; H03M 13/2721; H03M 13/2792; H03M 13/2915; H03M 13/2936; H03M 13/356; H03M 7/30; H04N 19/124; H04N 19/436; H04N 19/115; H04N 19/132; H04N 19/14; H04N 19/179; H04N 19/625; H04N 19/126; H04N 19/146; H04N 19/15
(Continued)

(56) References Cited

U.S. PATENT DOCUMENTS

| 8,705,623 B2 | 4/2014 | Chen et al. |
| 8,767,825 B1 | 7/2014 | Wang et al. |

(Continued)

FOREIGN PATENT DOCUMENTS

| EP | 2285111 | 2/2011 |
| WO | 9938333 | 7/1999 |

OTHER PUBLICATIONS

International Telecommunication Union, MPEG4 part 10, "H.264 : Advanced video coding for generic audiovisual services" https://www.itu.int/rec/T-REC-H.264-201610-P/en, Oct. 2016, 1 page.
(Continued)

*Primary Examiner* — Linh V Nguyen
(74) *Attorney, Agent, or Firm* — Lowenstein Sandler LLP

(57) ABSTRACT

Implementations disclose adaptive rate control technology that selects different encoders for different chunks of a media item based on the complexity of the individual chunks. A method includes accessing a media item comprising a first chunk and a second chunk; determining, by a processing device, a first media complexity measure for the first chunk and a second media complexity measure for the second chunk; selecting, by the processing device, a first encoder and a second encoder from a plurality of encoders, wherein the first encoder is selected based on the first media complexity measure of the first chunk and the second encoder is selected based on the second media complexity measure of the second chunk; and encoding the first chunk using the first encoder and encoding the second chunk using the second encoder.

20 Claims, 4 Drawing Sheets

(51) Int. Cl.
*H04L 12/24* (2006.01)
*H04L 29/06* (2006.01)
*H04N 19/40* (2014.01)
*H04N 19/109* (2014.01)
*H04N 19/11* (2014.01)
*H04N 19/112* (2014.01)
*H04N 19/12* (2014.01)
*H04N 19/152* (2014.01)
*H04N 19/169* (2014.01)
*H04N 19/137* (2014.01)
*H04N 19/194* (2014.01)

(52) U.S. Cl.
CPC .......... *H04N 19/109* (2014.11); *H04N 19/11* (2014.11); *H04N 19/112* (2014.11); *H04N 19/12* (2014.11); *H04N 19/137* (2014.11); *H04N 19/152* (2014.11); *H04N 19/169* (2014.11); *H04N 19/194* (2014.11); *H04N 19/40* (2014.11)

(58) Field of Classification Search
USPC ............... 341/51, 107; 375/240.16, 240.24, 375/E07.124
See application file for complete search history.

(56) References Cited

U.S. PATENT DOCUMENTS

| | | | |
|---|---|---|---|
| 9,294,531 B2* | 3/2016 | Zhang | H04L 65/601 |
| 9,338,467 B1 | 5/2016 | Gadepalli et al. | |
| 2003/0023982 A1* | 1/2003 | Lee | H04N 21/23436 |
| | | | 725/116 |
| 2003/0156198 A1 | 8/2003 | Lee | |
| 2005/0232497 A1 | 10/2005 | Yogeshwar et al. | |
| 2006/0114995 A1* | 6/2006 | Robey | H04N 19/573 |
| | | | 375/240.12 |
| 2006/0126728 A1* | 6/2006 | Yu | H04N 21/44004 |
| | | | 375/240.03 |
| 2007/0002946 A1* | 1/2007 | Bouton | H04N 19/115 |
| | | | 375/240.01 |
| 2008/0192822 A1 | 4/2008 | Chang et al. | |
| 2008/0112483 A1 | 5/2008 | Lu et al. | |
| 2010/0226430 A1* | 9/2010 | Hamilton | H04N 19/115 |
| | | | 375/240.03 |
| 2011/0002381 A1 | 1/2011 | Yang et al. | |
| 2011/0225385 A1* | 9/2011 | Tofano | G06F 17/30156 |
| | | | 711/170 |
| 2011/0299589 A1* | 12/2011 | Zhou | H04N 21/2401 |
| | | | 375/240.02 |
| 2012/0147958 A1* | 6/2012 | Ronca | H04N 19/14 |
| | | | 375/240.16 |
| 2013/0089139 A1* | 4/2013 | Kudana | H04N 19/139 |
| | | | 375/240.03 |
| 2013/0094564 A1 | 4/2013 | Yang et al. | |
| 2013/0287361 A1* | 10/2013 | Teixeira | H04N 9/79 |
| | | | 386/224 |
| 2015/0195525 A1* | 7/2015 | Sullivan | H04N 19/142 |
| | | | 375/240.02 |
| 2015/0255076 A1* | 9/2015 | Fejzo | G10L 19/24 |
| | | | 704/500 |
| 2016/0219286 A1 | 7/2016 | Gadepalli et al. | |

OTHER PUBLICATIONS

International Search Report and Written Opinion for application No. PCT/US2018/018849 dated Jul. 30, 2018, 21 pages.

* cited by examiner

COMPLEXITY ADAPTIVE RATE CONTROL

TECHNICAL FIELD

This disclosure relates to the field of media transcoding and, in particular, to determining the complexity of multiple chunks of a media item and using the complexity when choosing between multiple different transcoders.

BACKGROUND

Content-sharing platforms enable users to share video, audio, and other user generated content. The content-sharing platform often transcode the user generated content (e.g., original source video) from an encoded format that is native to the user device to one or more formats used by the content-sharing platform. The transcoding may involve decoding the source video from its original format into an un-encoded representation and then encoding the un-encoded representation with an encoder for a new format. The transcoding may reduce the storage resources and bandwidth resources for serving the video to clients.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes accessing a media item comprising a first chunk and a second chunk; determining, by a processing device, a first media complexity measure for the first chunk and a second media complexity measure for the second chunk; selecting, by the processing device, a first encoder and a second encoder from a plurality of encoders, wherein the first encoder is selected based on the first media complexity measure of the first chunk and the second encoder is selected based on the second media complexity measure of the second chunk; and encoding the first chunk using the first encoder and encoding the second chunk using the second encoder.

In one implementation, the method may also include receiving the media item from a user device that captured and recorded the media item and segmenting the media item into a plurality of chunks comprising the first chunk and the second chunk. The method may also involve combining the first chunk of the media item encoded using a single pass encoder with the second chunk of the media item encoded using a two-pass encoder to form an encoded media item. Selecting the first encoder may involve comparing the first media complexity measure of the first chunk to a predetermined threshold value and selecting the single pass encoding responsive to the first media complexity measure being below a predetermined threshold.

In another implementation, the first media complexity measure and the second media complexity measure may indicate a spatial and temporal distribution of a respective chunk. When the media item is a video, the method may involve determining a video coding complexity measurement for the first chunk and a video coding complexity measurement for the second chunk of the media item. Determining the video coding complexity (VCC) measurement of the first chunk may involve determining a bit rate (R), a frame rate (Fps), a chroma factor (CF), a frame width (W), and a frame height (H) in pixels of the first chunk, and further involve calculating a value for the video coding complexity based on the following mathematical formula: $VCC=R/(W*H*Fps*CF)$.

In yet another implementation, the plurality of encoders may comprise variable bitrate encoders, and the first encoder comprises a single pass encoder and the second encoder comprises a multiple pass encoder. The first chunk of the media item may be encoded using the single pass encoder and the second chunk of the media item may be encoded using the multiple pass encoder. The single pass encoder may be a single pass transcoder comprising a video buffering verifier that is implemented using a leaky bucket model and the multiple pass encoder may be a two pass transcoder comprising a constrained quality and a bounded bitrate.

BRIEF DESCRIPTION OF THE DRAWINGS

The present disclosure is illustrated by way of example, and not by way of limitation, in the figures of the accompanying drawings.

DETAILED DESCRIPTION

Figure 1:
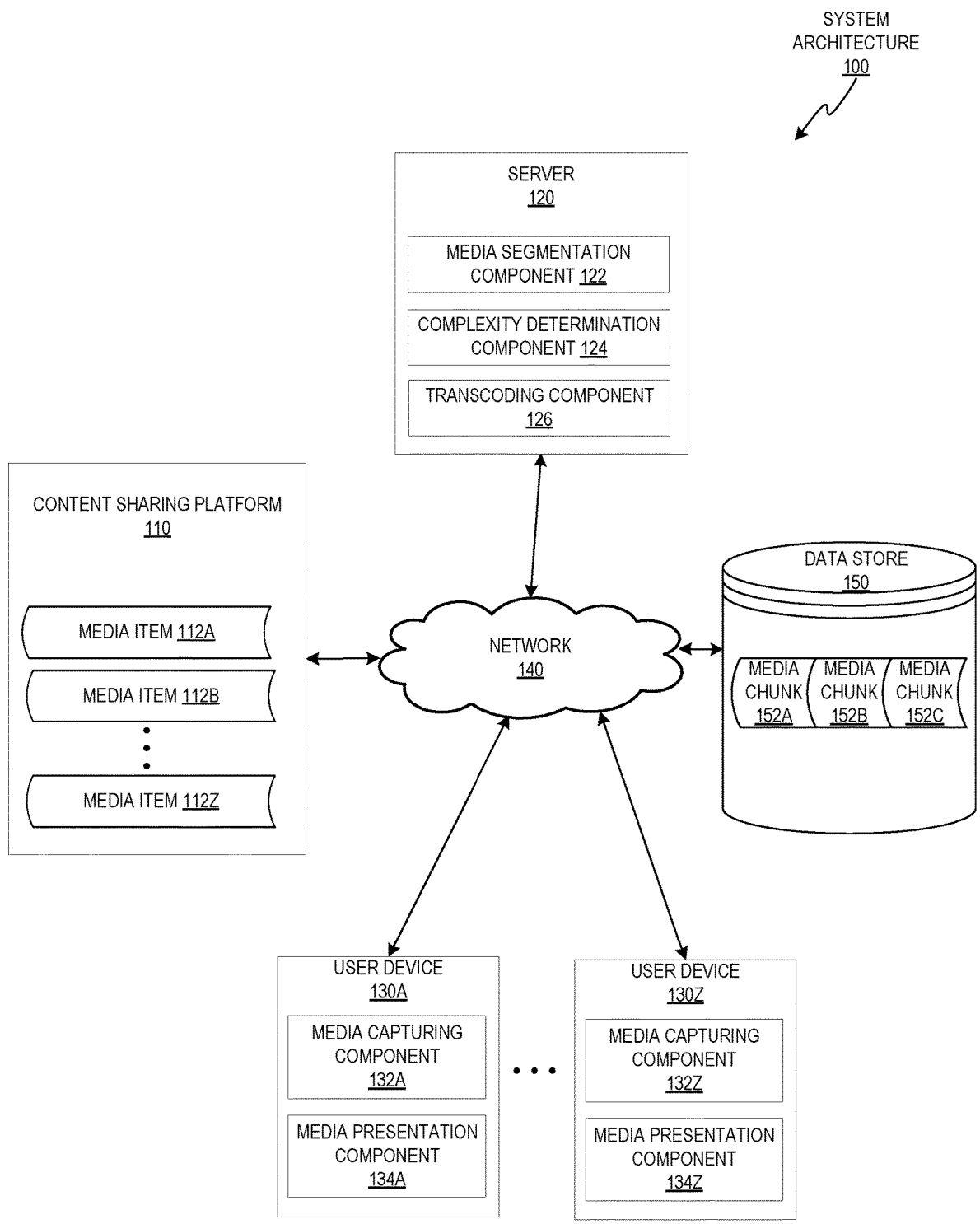
FIG. 1 is a block diagram illustrating an exemplary system architecture, in accordance with an implementation of the disclosure.

Content sharing platforms often receive millions of incoming media items that are processed and transcoded to make the media items available to be shared. Transcoding the media item using conventional media coding systems incur long latency. The transcoding latency often increases depending on a video's resolution, bit rate, frame rate, duration, or image quality. For example, transcoding a three-minute video to a video in high-definition (HD) format by a single video transcoder may take ten times longer than the duration of the video content. The long transcoding latency can further delay downstream processing (e.g., video analysis or streaming) leading to a deteriorated user experience. Conventional video transcoders often attempt to reduce latency by ignoring the impact of video content and coding complexity on transcoding. Transcoding a video without considering the impact of video content and complexity on transcoding can degrade video quality and user experience.

Aspects and implementations of the disclosure address the above and other deficiencies by selecting between different encoders for different chunks of a media item based on the complexity of the individual chunks. In one example, the technology may involve segmenting a media item into multiple chunks. Some of the chunks may be encoded by a first encoder and other chunks may be encoded by a second encoder. The selection of which encoder is used for which chunk may be based on the complexity of the respective chunk (e.g. quantity of motion, color variations, audio fluctuations). The complexity of the chunks may be represented using a media complexity measurement, which may be a numeric or non-numeric value that indicates the complexity of a previously encoded chunk. When the media item is a motion picture (e.g., a video), the media complexity measurement may be referred to as a video coding complexity measurement. In one example, the video coding complexity measurement may be determined by analyzing the spatial-temporal distribution (e.g., content motion) of a particular chunk. In another example, the media complexity measure maybe approximated based on the bitrate of the chunk divided by a combination of the number of pixels in a frame multiplied by the frame rate and other information using a mathematic equation discussed below. The bitrate may be the bitrate needed to achieve a predefined quality level or an acceptable quality level. In either example, the media complexity measurement (e.g., video coding complexity) may be analyzed and compared to one or more thresholds when selecting an encoder.

The systems and methods discussed herein may select a first encoder for chunks that are more complex and a second encoder for chunks that are less complex. In one example, the first encoder may be a multiple pass encoder and the second encoder may be a single pass encoder. A multiple pass encoder may perform a first pass that analyzes the chunk and a subsequent pass may encode the chunk using information gathered during the analysis. A single pass encoder may analyze and encode while it is processing the chunk. The single pass encoder may use less computing resources than the multiple pass encoder, but the encoding results may be less efficient than the results of the first encoder (e.g., lower compression or lower quality). The enhanced encoding efficiency may be easily perceived by a user when the chunks are more complex but the results may be more difficult to perceive when the chunks are less complex. The technology discussed herein may select the first encoder for more complex chunks of the media item and select the second encoder for less complex chunks so that the aggregate encoding of the media item may be performed in a more resource efficient manner with nearly the same compression and quality.

The technology disclosed herein is advantageous because it enables a computing device to encode media items at a faster rate or at a higher quality compared to using either the single pass or multiple pass encoders alone. In one example, this may enable a content sharing platform to process incoming media items using less computing resources. In another example, this may enable the content sharing platform to process incoming media items at a higher quality using the same amount of computing resources.

Various aspects of the above referenced methods and systems are described in details herein below by way of examples, rather than by way of limitation. The examples provided below often reference videos for simplicity and brevity. However, the teaching of the present disclosure are applied to media items generally and can be applied to various types of content or media items, including for example, audio, text, images, program instructions, etc.

FIG. 1 illustrates an example system architecture 100, in accordance with one implementation of the disclosure. It should be noted that other architectures for computer system 100 are possible, and that the implementation of a computer system utilizing embodiments of the disclosure are not necessarily limited to the specific architecture depicted. The system architecture 100 includes a content sharing platform 110, a server 120, user devices 130A-Z, a network 140, and a data store 150.

Content sharing platform 110 may enable users to consume, upload, share, search for, approve of ("like"), dislike, and/or comment on media items 112A-Z. Content sharing platform 110 may include a website (e.g., a webpage) or application back-end software that may be used to provide a user with access to media items 112A-Z. Media items 112A-Z may be digital content chosen by a user, digital content made available by a user, digital content uploaded by a user, digital content chosen by a content provider, digital content chosen by a broadcaster, etc. Examples of media items 112A-Z may include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. Media items 112A-Z may be consumed via the Internet and/or via a mobile device application. For brevity and simplicity, an online video (also hereinafter referred to as a video) is used as an example of a media item throughout this document.

As used herein, "media," media item," "online media item," "digital media," "digital media item," "content," and "content item" can include an electronic file that can be executed or loaded using software, firmware, or hardware configured to present the digital media item to an entity. In one implementation, the content sharing platform may store the media items 112A-Z using the data store 150. In one example, a media item may be a user generated video identified by a user of user device 130A or may be an advertisement selected by content sharing platform 110 to be presented before, during, or after presenting another media item on one or more of the user devices 130A-Z.

Media chunks 152A-C may be different portions of a particular media item (e.g., media item 112A). In the example shown in FIG. 1, media chunks 152A-C may be a sequence of media chunks that include the segmented content of media item 112A. The segmented content may be in the same format as the media item or may be in a different format. The sequence may be a continuous sequence of non-overlapping media chunks. For example, a media item with a duration of X may be split into 4 chunks that each have a fixed duration of X/4 or an average duration of X/4 (i.e., when variably segmented). In another example, one or more of the chunks may overlap with one or more of the other chunks. For example, a media item with a duration of X may be split into 5 chunks and four of the chunks may include a sequence of image content (e.g., video content) as discussed above and one chunk may include all of the audio content. The chunks with the image content may not overlap one another but the audio content may overlap each of the four image content chunks. In one example, a chunk with video content (e.g., a video chunk) may include video data of an intermediate stream. The video chunk may be identified by chunk identification data (e.g., v_id_123) and the identification data for a subsequent video chunk in the sequence of the video chunks may be incremented by a fixed amount (e.g., v_id_124).

Server 120 may be a part of content sharing platform 110 or may be a separate device for processing media items 112A-Z. Server 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components. In the example shown in FIG. 1, server 120 may include a media segmentation component 122, a complexity determination component 124, and a transcoding component 126.

Media segmentation component 122 may analyze the media items 112A-Z and may segment each of the media items into one or more portions. Media segmentation component 122 may access each of the media items 112A-Z and convert the media item into an intermediate data structure, such as an intermediate stream. Media segmentation component 122 may then segment the media stream into one or more chunks (e.g., media chunks 152A-C).

Complexity determination component 124 may determine the complexity of media chunks 152A-C by analyzing the media item as a whole or by analyzing a portion of the media item, such as the metadata of the media item or one or more chunks of the media item, as will be discussed in greater detail below. The analysis may identify coding complexity data for each of the media chunks and the coding complexity data may be used to determine one or more measurements that may represent the image or auditory complexity of a chunk of a media item.

Transcoding component 126 may access the coding complexity data and select one or more encoders (e.g., transcoders) to modify the chunks. Transcoding component 126 may select multiple different encoders to encode multiple different chunks of the same media item. For example, some of the chunks may be encoded using a first transcoder and other chunks of the same media item may be encoded using a different transcoder. Once the media item has been transcoded, it may be provided by server 120 or other computing device of content sharing platform 110 to one or more user devices 130A-Z.

User devices 130A-Z may include computing devices such as personal computers (PCs), laptops, mobile phones, smart phones, tablet computers, netbook computers, network-connected televisions, etc. In some examples, user devices 130A-Z may also be referred to as "client devices." Each of the user devices 130A-Z may include a media capturing component 132A-Z and a media presentation component 134A-Z.

Media capturing component 132A-Z may enable a user device to capture audio data and image data sensed by the user device to create a media item. Media presentation component 134A-Z may enable a user device to present (e.g., play) the recorded media item or one or more media items received from content sharing platform 110. Media presentation component 134A-Z may include a media viewer that presents images, videos, audio, web pages, documents, etc.

In one example, the media viewer may be a web browser that can access, retrieve, present, and/or navigate content (e.g., web pages such as Hyper Text Markup Language (HTML) pages, digital media items, etc.) served by a web server. The media viewer may render, display, and/or present the content (e.g., a web page, a media viewer) to a user. The media viewer may also display an embedded media player (e.g., a Flash® player or an HTML5 player) that is embedded in a web page (e.g., a web page that may provide information about a product sold by an online merchant). In another example, the media viewer may be a standalone application (e.g., a mobile application) that allows users to view digital media items (e.g., digital videos, digital images, electronic books, etc.). In the example shown in FIG. 1, each of the user devices 130A-Z may function as a media sharing device, a media recipient device, or a combination of both.

Network 140 may be a public network that provides one or more of user devices 130A-Z with access to server 120 and other publically available computing devices. Network 140 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

Data store 150 may be a memory (e.g., random access memory), a drive (e.g., a hard drive, a flash drive), a database system, or another type of component or device capable of storing data. Data store 150 may include multiple storage components (e.g., multiple drives or multiple databases) that may span multiple computing devices (e.g., multiple server computers). Data store 150 may include a media cache that stores copies of media items that are received from the content sharing platform 110. In one example, each of the media items 112A-Z may be a file that is downloaded from content sharing platform 110 and may be stored locally in media cache. In another example, each media item 112 may be streamed from content sharing platform 110 and may exist as an ephemeral copy in memory of server 120 until it is transcoded.

Although implementations of the disclosure are discussed in terms of a server and a content sharing platform, implementations may also be generally applied to any type of social network providing digital content and connections between users. In situations in which the systems discussed here collect personal information about users, or may make use of personal information, the users may be provided with an opportunity to control whether the content sharing platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user."

Figure 2:
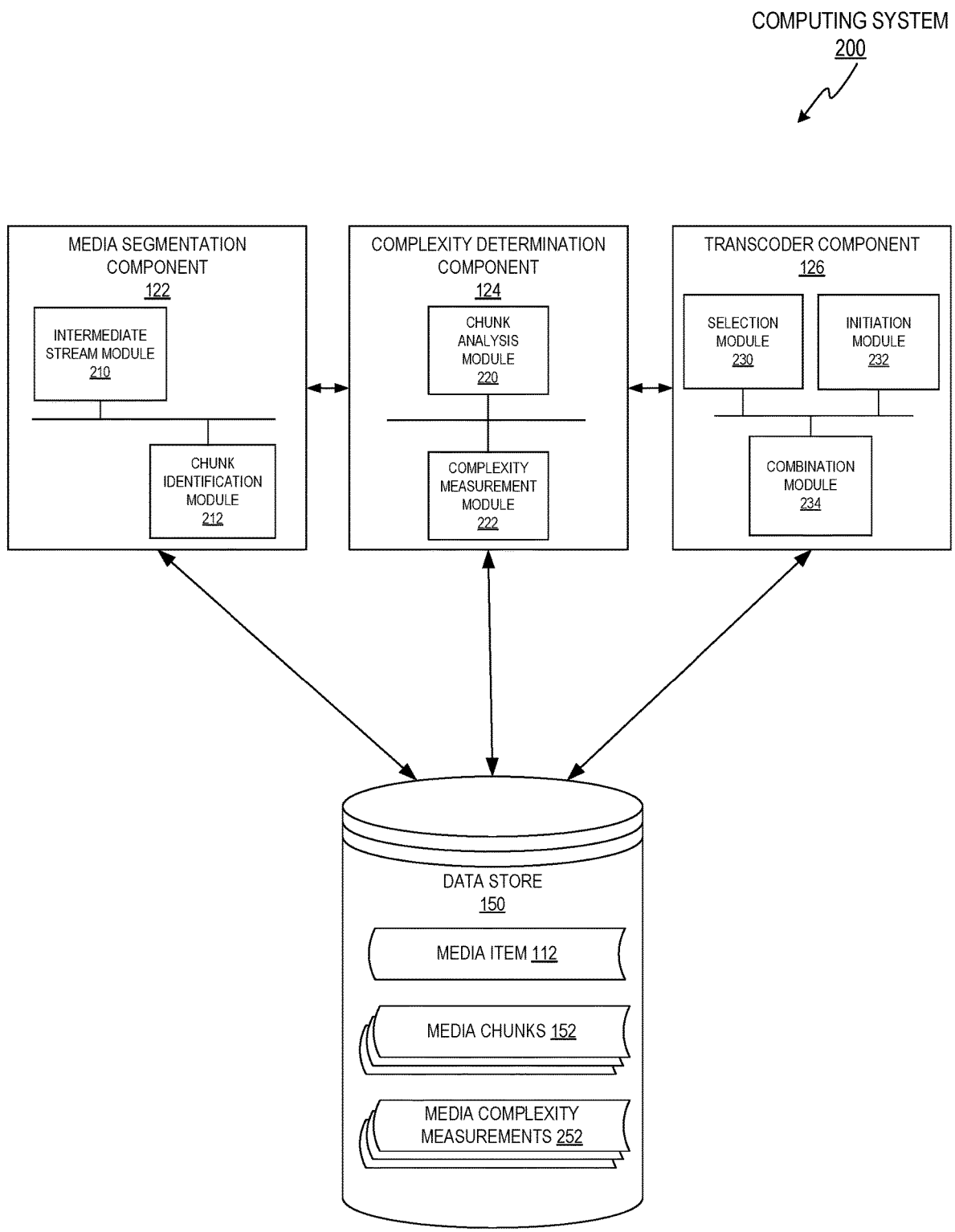
FIG. 2 is a block diagram illustrating the components and modules of an example computing system, in accordance with an implementation of the disclosure.

FIG. 2 is a block diagram illustrating an example computer system 200. Computer system 200 may be the same or similar to server 120 of FIG. 1. In the example shown in FIG. 2, computer system 200 includes media segmentation component 122, complexity determination component 124, transcoding component 126, and data store 150.

Media segmentation component 122 may analyze a media item 112 and may perform one or more pre-processing steps on media item 112 to segment the media item into one or more media chunks 152. In one example, media segmentation component 122 may include an intermediate stream module 210 and a chunk identification module 212.

Intermediate stream module 210 may access media item 112 from one or more data stores 150. The media item 112 may be in a format that is specific to a computing device or hardware device that captured, recorded, transformed, or stored media item 112. The format may be a particular multimedia container format for identifying and interleaving data and may include different types of data such as video streams, audio streams, or a combination thereof. The formats may be the same or similar to Moving Picture Experts Group Standard (MPEG) (e.g., MPEG4), QuickTime File Format, Flash Video (.FLV, F4V), Audio Video Interleaved (AVI), Windows Media Video (WMV)), other format, or a combination thereof. In one example, the media item 112 may be in a native format that is specific to a user device that captured and recorded the media item (e.g., mobile phone, digital movie camera). In another example, media item 112 may be transformed to one or more formats that are particular to a content sharing platform. In either example, the format of media item 112 may be considered the source format or original format. Intermediate stream module 210 may transform media item 112 from the original format to one or more intermediate formats. This may involve decoding the media item from the original format into an intermediate format. The intermediate format may be in the form of a stream (e.g., intermediate stream) and may be different from the native format or may be similar to or the same as the native format.

Chunk identification module 212 may access the intermediate stream and segment the intermediate stream into one or more fix sized or variably sized media chunks 152. Taking video transcoding as an example, the chunk identification module 212 may split the intermediate stream into fix sized video chunks. For example, every 15 seconds of the video data of the intermediate video stream may be identified as an individual video chunk. In another example, the chunk identification module 212 may split the intermediate stream into variable sized video chunks based on a pre-existing boundary, such as an intra-frame boundary. In either example, chunk identification module 212 may segment the video content into video chunks, each of which contains at least one or more images of the video data of the intermediate stream.

For an intermediate stream with audio content, chunk identification module 212 may segment the intermediate stream into multiple audio chunks. Audio data of a video stream may be sampled at a higher frequency (e.g., 48 kHz) and no inter-frame compression is required (e.g., MP3 audio data). Further, comparing with computationally expensive video data transcoding due to complex video processing (e.g., motion estimation and compensation), audio transcoding can be much cheaper. In one example, the audio chunks of the intermediate stream may be larger than the video chunks of the intermediate stream. In another embodiment, the audio content of the intermediate stream may be separated from video or image content without being segmented and the entire audio content may be treated as a single audio chunk.

Complexity determination component 124 may determine the complexity of media chunks 152 by analyzing the media item as a whole or by analyzing a portion of the media item, such as the metadata of the media item or one or more chunks of the media item. The analysis may identify coding complexity data for the chunks and the coding complexity data may be used to determine one or more media complexity measurements that may represent the auditory, image, or video coding complexity of a chunk of a media item. Complexity determination component 124 may determine media complexity measurements 252 for a chunk using a chunk analysis module 220 and a complexity measurement module 222.

Media complexity measurements 252 may be numeric or non-numeric values that represent the coding complexity of one or more media chunks 152 and may indicate the difficulty of encoding a particular chunk of media item 112. A media complexity measurement may be directly or indirectly related (e.g., proportionate) to the amount of spatial and/or temporal information (e.g., motion data) contained in a chunk of a media item 112. For example, a higher media complexity measurement may correspond to a large motion-compensated luminance residual value or luminance variance of pixel value in a video frame because this often corresponds to a large spatial activity of the video frame. Extracted temporal features of a video frame, such as the length/entropy of motion vectors and energy of frame residual may also reflect the amount of motion present in the video frame.

Chunk analysis module 220 may analyze a chunk by gathering content information associated with the chunk. The content information may be gathered without performing a frame-by-frame analysis of the chunk, for example, it may involve analyzing metadata that is associated with the chunk or media item. Chunk analysis module 220 may gather information from multiple sources and the information may be related to the particular chunk, the corresponding media item, other chunk or media item, a computing device, a user, other information or a combination thereof. The content information may relate to a dimension of one or more image frames of the media item or of the chunk. The dimensions of a frame may include or be related to a frame width (W), a frame height (H), an aspect ratio, other dimension or a combination thereof. The dimensions of a frame may be expressed in pixel quantities (e.g., 1920× 1080), resolution values (e.g., 1080p, 720p, 1080i, 720i), resolution modes (e.g., Standard Definition (SD), High Definition (HD), Ultra High Definition (UHD)), other value, or a combination thereof.

The content information may include information about the frame rate or bit rate of the chunk. The frame rate (e.g., frame frequency) may refer to the number of frames displayed over a unit of time and may be expressed as frames per second (Fps). The bit rate (R) or encoding bit rate may refer to the number of bits used per unit of playback time to represent audio or video after source coding (e.g., data compression). The bit rate may be an average bitrate when used in the context of variable bitrate multimedia source coding schemes. The encoding bit rate of a chunk may be the size of the chunk in bytes divided by the playback time of the recording (in seconds) multiplied by eight. In general, a higher bit rate indicates a chunk includes more complicated content. This may be because there is often a correlation between the spatial and temporal features of a video and its corresponding encoding bitrate.

The content information may relate to the chrominance of the chunk and may convey the color related information of the chunk. The color information may be based on a family of color spaces (e.g., YCbCr, YUV) used as part of a color image pipeline in digital or analog videography. An example color space may be the YCbCr (YCC) color space, which may be defined by mathematical coordinate transformations from an associated Red Green Blue (RGB) color space. Y (or Y') may be the luma component and Cb and Cr may be the blue-difference and red-difference chroma components respectively.

Media items are often compressed by reducing the color information available in an encoded media items by performing chroma subsampling. Chroma subsampling may encode an image with a resolution for chroma information (e.g., color information) that is less that the resolution for luma information (e.g., brightness). The subsampling scheme is commonly expressed as a three part ratio J:a:b (e.g. 4:2:2) that describe the number of luminance and chrominance samples in a conceptual region that is J pixels wide and may be two pixels high. The "J" represents the horizontal sampling reference and is often the value 4. The "a" represents the number of chrominance samples (Cr, Cb) in the first row of J pixels and the "b" represents the number of changes of chrominance samples (Cr, Cb) between first and second row of J pixels.

The quantity of chroma subsampling may be represented by a chroma factor (CF). In one example, the chroma factor may be calculated relative to a base line, such as a 4:4:4 baseline. The chroma factor may then be determined by summing each of the factors and dividing the result by 12 (i.e., 4+4+4). For example, a compressed image using a 4:2:2 Y'CbCr chroma subsampling scheme may have a two-thirds chroma factor because 4+2+2 is 8 and 8/12 is two-thirds.

Complexity measurement module 222 may access the content information determined by chunk analysis module 220 and may calculate media complexity measurements 252 for the media chunks 152. When a media chunk includes video content, the media complexity measurement may be a video coding complexity (VCC) measurement that is approximated based on a bits per pixel (bpp) value. The bits per pixel value may represent the number of bits that are used to encode a pixel at a given quality level across one or more frames of the chunk. In one example, complexity measurement module 222 may determine the video coding complexity (VCC) measurement of a chunk by accessing content information that includes the bit rate (R), frame rate (Fps), a chroma factor (CF), a frame width (W), and a frame height (H) in pixels of the chunk. Complexity measurement module 222 may then calculate a value for the video coding complexity based on a mathematical formula comprising: $VCC=R/(W*H*Fps*CF)$.

Complexity measurement module 222 may enhance the accuracy of the media complexity measurement 252 (e.g., video coding complexity measure) by supplementing or basing a VCC value on one or more additional spatial and/or temporal features of the source media chunk 152. For example, the VCC value of a media chunk 152 may additionally or alternatively be computed based on frame-level spatial variance, residual energy, number of skipped macroblocks (MBs) and number of bits to encode the motion vector of a predictive macroblock of a chunk. Other coding parameters, such as universal workload of encoding the source media chunk 152, can be used in VCC value calculation.

Complexity determination component 124 may incorporate machine learning techniques to enhance the determination of the media complexity measurements. In one example, complexity determination component 124 may be trained off-line using media items selected from a media datastore to learn the correlation between the spatial and temporal features of a media item and its corresponding encoding bitrate. For example, the complexity determination component 124 may be trained using a linear regression algorithm on a large media set (e.g., 20,000 videos from a video database). The linear regression algorithm may be used to model the relationship between a selected video feature and a normalized bitrate.

Transcoding component 126 may access the coding complexity data and select one or more encoders (e.g., transcoders) to modify the chunks. Transcoding component 126 may select multiple different encoders to transcode multiple different chunks of the same media item. For example, some of the chunks may be encoded using a first transcoder and other chunks of the same media item may be encoded using a different transcoder. Once the media item has been transcoded, it may be provided by server 120 or other computing device of content sharing platform 110 to one or more user devices 130. In one example, transcoding component 126 may include a selection module 230, an initiation module 232, and a combination module 234.

Selection module 230 may access the media complexity measurements 252 for each of the media chunks 152 and may select a transcoder for the media chunk based on the respective media complexity measurement. Selection module 230 may use one or more thresholds when selecting between different encoders. The threshold may be based on a predetermined value stored on or accessible to computing system 200 and may correspond to a particular value (e.g., bits per pixel (bpp) value) for a media chunk complexity threshold. The predetermined threshold may be based on input of a designer, developer, administrator, other user, or a combination thereof. The predetermined threshold may be generated or adjusted based on machine learning and may be updated over time based on feedback before, during, or after encoding has been completed on a chunk.

Selection module 230 may compare a media complexity measure of a chunk to a predetermined threshold value when selecting a particular encoder to encode the media chunk. The predetermined threshold (e.g., VCC threshold or bpp threshold) may reflect a division point between categories of coding complexity. In one example, there may be two categories and a predetermined threshold complexity value may signify a division between the two groups. Chunks with media complexity measurement values that are below the threshold may be associated with a first set of chunks (e.g., lower complexity chunks) and chunks with media complexity measurement values that are equal to or above the threshold may be associated with a second set of chunks (e.g., higher complexity chunks). Selection module 230 may select a single pass encoder/transcoder to encode chunks associated with a lower complexity and may select a multiple pass encoder/transcoder to encode chunks associated with a higher complexity. In other examples, there may be more than two categories of complexity.

Initiation module 232 may generate an encoding request based on a media chunk and the selected encoder. The encoding request may include one or more of a chunk identifier, a media content type (e.g., video chunk, audio chunk), an encoder identifier (e.g., single pass, multiple pass), a chunk size, a chunk offset (e.g., offset with respect to media item), a timestamp, a source format, a target format, other information, or a combination thereof. Initiation module 232 may submit a request for an individual media chunk 152 or may submit a request for multiple media chunks 152. For example, there may be a request that identifies one or more of the higher complexity chunks (e.g., all of first set) and another request that identifies one or more of the lower complexity chunks (e.g., all of second set). Initiation module 232 may transmit the requests to a component on computer system 200 to perform the encoding or may transmit the request to one or more other computer systems (e.g., members of a cluster) to perform the encoding. In either example, the encoding of the media chunks may occur in parallel, serially, or a combination thereof.

Combination module 234 may access the encoded media chunks and may combine the encoded media chunks to generate an encoded version of the media item. Combination module 234 may access the encoded media chunks and may merge the encoded chunks into a merged media item. The merge process may involve detecting a chunk that corresponds to the beginning of the media item. Responsive to the encoded chunk being the first chunk, the combination module 234 may keep the header information and for the remaining chunks (e.g., non-first chunks) the combination module 234 may remove the header information. Combination module 234 may combine the encoded chunks in order and the position of an encoded chunk in the combined media item may be based on the chunk identification. For example, chunks in an H.264 video format may contain a network abstract layer (NAL) header and the combination module 234 may keep the NAL header contained in the first video chunk and strips the NAL header in subsequent video chunks.

Figure 3:
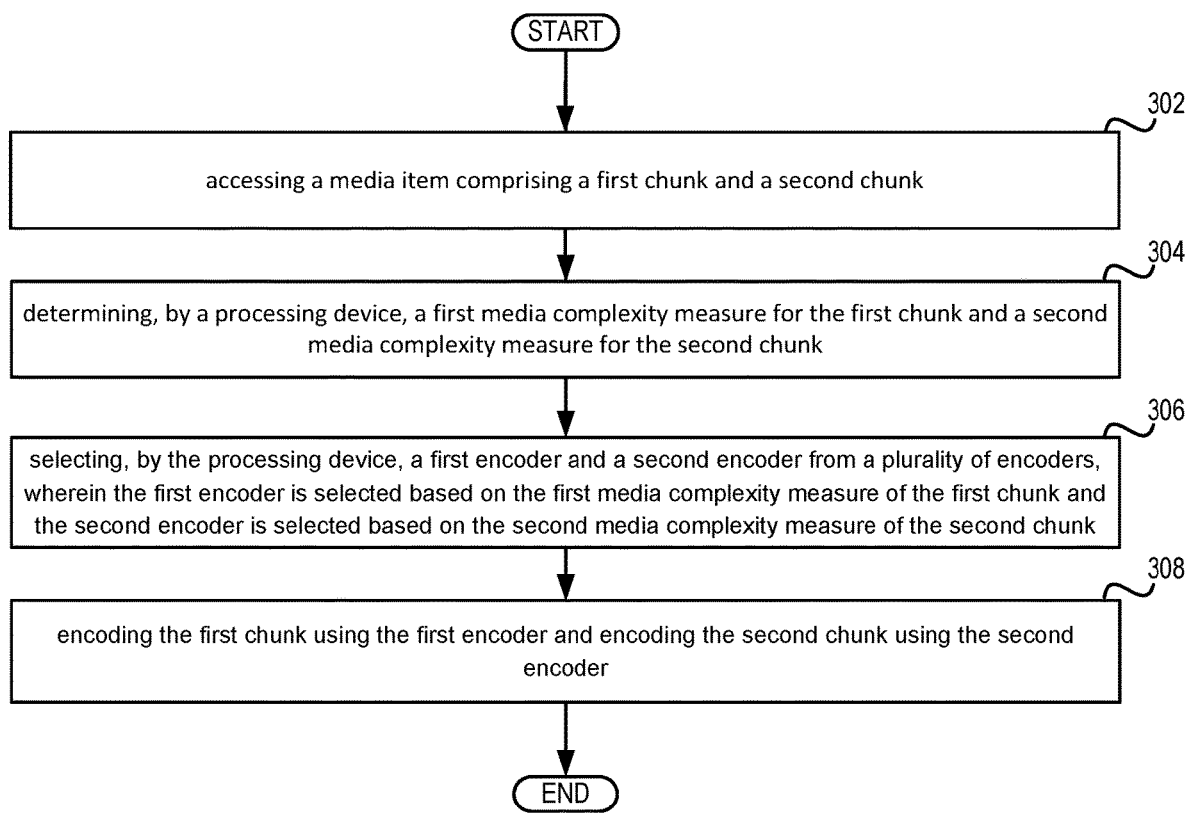
FIG. 3 is a flow diagram illustrating an example method of a transcoding server, in accordance with an implementation of the disclosure.

FIG. 3 depicts a flow diagram of one illustrative example of a method 300 for using multiple different transcoders to transcode different chunks of the same media item, in accordance with one or more aspects of the present disclosure. Method 300 and each of its individual functions, routines, subroutines, or operations may be performed by one or more processors of the computer device executing the method. In certain implementations, method 300 may be performed by a single computing device. Alternatively, methods 300 may be performed by two or more computing devices, each computing device may execute one or more individual functions, routines, subroutines, or operations of the method. In an illustrative example, the computing devices implementing methods 300 may be synchronized. Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by server 120 of FIG. 1 or computing system 200 of FIG. 2.

Method 300 may be performed by processing devices of a server device or a client device and may begin at block 302. At block 302, a processing device may access a media item comprising a first chunk and a second chunk. The processing device may receive the media item from a user device that captured and recorded the media item and may segment the media item into a plurality of chunks including the first chunk and the second chunk. In one example, the first chunk of the media item and the second chunk of the media item may be derived from a sequence of non-overlapping durations of the media item. For example, the media item may be five minutes long and may be segmented into chunks such that each of the chunks can be concatenated to produce the media item. In another example, the first chunk and the second chunk may be partially or completely overlapping. For example, the first chunk may include audio content of a video and the second chunk may be image content of the video and the audio content may overlap with the video content such that some or all of the audio content and the video content are presented concurrently. In either example, the processing device may access chunks (e.g., the first and second chunks) that are downscaled to a lower resolution as a substitute for the original chunks so that the media complexity measurement can be determined using less computing resources.

At block 304, the processing device may determine a first media complexity measure for the first chunk and a second media complexity measure for the second chunk. Each of the first media complexity measure and the second media complexity measure may indicate a spatial and temporal distribution of a respective chunk. When the media item is a video, the media complexity measures may include a video coding complexity measurement for the first chunk and a video coding complexity measurement for the second chunk of the media item. In one example, determining the video coding complexity (VCC) measurement of the first chunk may involve determining a bit rate (R), a frame rate (Fps), a chroma factor (CF), a frame width (W), and a frame height (H) of the first chunk. This content information may be used for calculating a value for the video coding complexity based on the following mathematical formula: VCC=R/(W*H*Fps*CF)

At block 306, the processing device may select a first encoder and a second encoder from a plurality of encoders. The first encoder may be selected based on the first media complexity measure of the first chunk and the second encoder is selected based on the second media complexity measure of the second chunk. In one example, selecting the first encoder may involve the processing device comparing the first media complexity measure of the first chunk to a predetermined threshold value and selecting the single pass encoding responsive to the first media complexity measure being below a predetermined threshold. The predetermined threshold may be based on a predetermined value provided by a designer, developer, administrator, other user, or a combination thereof. The predetermined threshold may be adjusted based on machine learning and may be modified over time based on feedback after the encoding has been completed on the chunks.

The plurality of encoders may include multiple variable bitrate encoders and the first encoder may be a single pass encoder and the second encoder may be a multiple pass encoder. The single pass encoder may be a single pass transcoder that includes a video buffering verifier (VBV) and the multiple pass encoder may be two pass transcoder comprising a constrained quality and a bounded bitrate. The video buffering verifier may be a video buffer model that is used with MPEG standards (e.g., MPEG 2) and may ensure that an encoded video stream can be correctly buffered and played on another device (e.g., decoding device, user device). The video buffering verifier may be used to determine (e.g., estimate or predict) whether there will be buffer overflow or buffer underflow at the receiving device (e.g., decoder device). The video buffering verifier may take into account the bitrate (e.g., maximum bitrate) at which the media stream is received and a buffer size in which the media stream is stored. In one example, the video buffering verifier may be implemented using one or more leaky bucket models. A leaky bucket model may be used to determine whether some sequence of discrete events conforms to defined limits on their average and peak rates or frequencies. The leaky bucket model may apply in packet switched computer networks to check that data transmissions (e.g., packets) conform to defined limits on bandwidth and burstiness. The burstiness being a measure of the variations in the flow of networking traffic.

At block 308, the processing device may encode the first chunk using the first encoder and encode the second chunk using the second encoder. In one example, the first chunk of the media item may be encoded using the single pass encoder and the second chunk of the media item may be encoded using the multiple pass encoder. The processing device may also combine the first chunk of the media item (encoded using a single pass encoder) with the second chunk of the media item (encoded using a two-pass encoder) to form an encoded media item. Responsive to completing the operations described herein above with references to block 308, the method may terminate.

Figure 4:
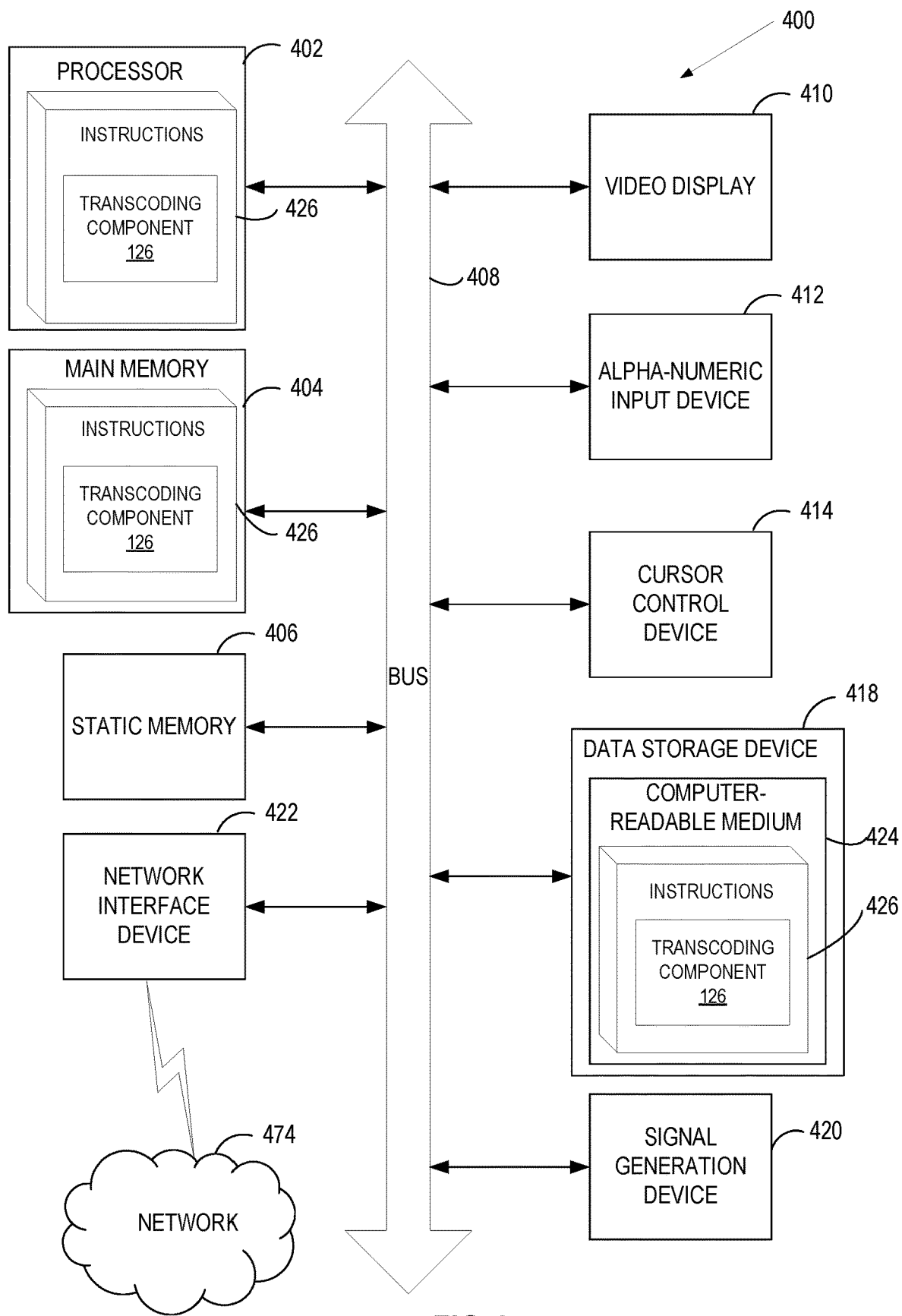
FIG. 4 is a block diagram illustrating one implementation of a computer system, in accordance with an implementation of the disclosure.

FIG. 4 depicts a block diagram of a computer system operating in accordance with one or more aspects of the present disclosure. In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions encoding transcoding component 126 of FIGS. 1 and 2 and for implementing method 300 of FIG. 3.

Instructions 426 may also reside, completely or partially, within volatile memory 404 and/or within processing device 402 during execution thereof by computer system 400, hence, volatile memory 404 and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "detecting," "determining," "releasing," "destroying," "initiating," "creating," "abandoning," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above. The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
  accessing a media item comprising a first chunk and a second chunk;
  determining, by a processing device, an average bit rate of the first chunk based on a storage size of the first chunk and a playback time of the first chunk;
  determining, by the processing device executing a complexity measurement module, a first media complexity measure for the first chunk and a second media complexity measure for the second chunk, wherein the first media complexity measure is determined using a mathematical formula that is based on the average bit rate of the first chunk and is determined without performing an analysis of image pixel values of one or more frames of the first chunk;
  selecting, by the processing device, a single pass encoder and a multiple pass encoder from a plurality of encoders, wherein the single pass encoder is selected based on the first media complexity measure of the first chunk and the multiple pass encoder is selected based on the second media complexity measure of the second chunk; and
  encoding the first chunk of the media item using the single pass encoder and encoding the second chunk of the media item using the multiple pass encoder.

2. The method of claim 1, wherein each of the plurality of encoders comprise a variable bitrate encoder.

3. The method of claim 1, wherein each of the first media complexity measure and the second media complexity measure corresponds to a spatial and temporal distribution of a respective chunk.

4. The method of claim 1, wherein the media item is a video and the first and second media complexity measures are video coding complexity (VCC) measurements, and wherein the determining comprises determining a video coding complexity measurement for the first chunk and a video coding complexity measurement for the second chunk of the media item.

5. The method of claim 1, wherein determining the second media complexity measure of the second chunk comprises determining, based on metadata of the second chunk, one or more of a bit rate (R), a frame rate (Fps), a chroma factor (CF), a frame width (W), or a frame height (H) in pixels of the second chunk, and further comprises the processing device to execute a complexity measurement module to calculate a value for the first media complexity measure (VCC) based on a mathematical formula comprising: VCC=R/(W*H*Fps*CF).

6. The method of claim 1, wherein the single pass encoder is a single pass transcoder comprising a video buffering verifier and wherein the multiple pass encoder comprises a two pass transcoder comprising a constrained quality and a bounded bitrate.

7. The method of claim 1, wherein the single pass encoder is implemented using a leaky bucket model.

8. The method of claim 1, wherein selecting the single pass encoder comprises:
  comparing the first media complexity measure of the first chunk to a predetermined threshold value; and
  selecting the single pass encoding responsive to the first media complexity measure being below a predetermined threshold.

9. The method of claim 1, further comprising:
  receiving the media item from a user device that captured and recorded the media item;
  segmenting the media item into a plurality of chunks comprising the first chunk and the second chunk; and
  combining the first chunk of the media item encoded using the single pass encoder with the second chunk of the media item encoded using the multiple pass encoder to form an encoded media item.

10. A system comprising:
  a memory;
  a processing device operatively coupled to the memory, the processing device to:
    access a media item comprising a first chunk and a second chunk;
    determine an average bit rate of the first chunk based on a storage size of the first chunk and a playback time of the first chunk;
    determine, by a complexity measurement module, a first media complexity measure for the first chunk and a second media complexity measure for the second chunk, wherein the first media complexity measure is determined using a mathematical formula that is based on the average bit rate of the first chunk and is determined without performing an analysis of image pixel values of one or more frames of the first chunk;
    select a single pass encoder and a multiple pass encoder from a plurality of encoders, wherein the single pass encoder is selected based on the first media complexity measure of the first chunk and the multiple pass encoder is selected based on the second media complexity measure of the second chunk; and
    encode the first chunk of the media item using the single pass encoder and encoding the second chunk of the media item using the multiple pass encoder.

11. The system of claim 10, wherein each of the plurality of encoders comprise a variable bitrate encoder.

12. The system of claim 10, wherein each of the first media complexity measure and the second media complexity measure corresponds to a spatial and temporal distribution of a respective chunk.

13. The system of claim 10, wherein the media item is a video and the first and second media complexity measures are video coding complexity (VCC) measurements, and wherein to determine comprises the processing device to determine a video coding complexity measurement for the first chunk and a video coding complexity measurement for the second chunk of the media item.

14. The system of claim 10, wherein to determine the second media complexity measure of the second chunk comprises the processing device to determine, based on metadata of the second chunk, one or more of a bit rate (R), a frame rate (Fps), a chroma factor (CF), a frame width (W), or a frame height (H) in pixels of the second chunk, and further comprises the processing device to execute a complexity measurement module to calculate a value for the second media complexity measure (VCC) based on a mathematical formula comprising: VCC=R/(W*H*Fps*CF).

15. A non-transitory machine-readable storage medium storing instructions which, when executed, cause a processing device to perform operations comprising:
  accessing a media item comprising a first chunk and a second chunk;
  determine an average bit rate of the first chunk based on a storage size of the first chunk and a playback time of the first chunk;
  determining a first media complexity measure for the first chunk and a second media complexity measure for the second chunk, wherein the first media complexity measure is determined using a mathematical formula that is based on the average bit rate of the first chunk and is determined without performing an analysis of image pixel values of one or more frames of the first chunk;

selecting, by the processing device, a single pass encoder and a multiple pass encoder from a plurality of encoders, wherein the single pass encoder is selected based on the first media complexity measure of the first chunk and the multiple pass encoder is selected based on the second media complexity measure of the second chunk; and encoding the first chunk of the media item using the single pass encoder and encoding the second chunk of the media item using the multiple pass encoder.

16. The non-transitory machine-readable storage medium of claim 15, wherein each of the plurality of encoders comprise a variable bitrate encoder.

17. The non-transitory machine-readable storage medium of claim 15, wherein each of the first media complexity measure and the second media complexity measure corresponds to a spatial and temporal distribution of a respective chunk.

18. The non-transitory machine-readable storage medium of claim 15, wherein the media item is a video and the first and second media complexity measures are video coding complexity (VCC) measurements, and wherein the determining comprises determining a video coding complexity measurement for the first chunk and a video coding complexity measurement for the second chunk of the media item.

19. The non-transitory machine-readable storage medium of claim 15, wherein determining the second media complexity measure of the second chunk comprises determining, based on metadata of the second chunk, one or more of a bit rate (R), a frame rate (Fps), a chroma factor (CF), a frame width (W), or a frame height (H) in pixels of the second chunk, and further comprises the processing device to execute a complexity measurement module to calculate a value for the video coding complexity based on a mathematical formula comprising: $VCC=R/(W*H*Fps*CF)$.

20. The method of claim 1, wherein the bit rate of the first chunk is based on a size of the first chunk and a playback time of the first chunk.

* * * * *